United States Patent
Hosan et al.

[11] Patent Number: 5,839,719
[45] Date of Patent: Nov. 24, 1998

[54] PNEUMATIC STRUT FOR A MOTOR VEHICLE WITH AN ADJUSTABLE LIMIT POSITION

[75] Inventors: Hans-Josef Hosan, Neuwied; Castor Fuhrmann, Brachtendorf; Hans-Klaus Schnitzius, Rheinbrohl, all of Germany

[73] Assignee: Stabilus GmbH, Koblenz, Germany

[21] Appl. No.: 777,703

[22] Filed: Dec. 20, 1996

[30] Foreign Application Priority Data

Dec. 21, 1995 [DE] Germany .......... 195 48 139.9

[51] Int. Cl.⁶ .................. F16F 9/44; F16F 9/02
[52] U.S. Cl. .................. 267/64.12; 188/300
[58] Field of Search ............... 188/279, 282, 188/282.2, 282.6, 285, 288, 300, 316; 267/64.12, 120; 297/344.1, 344.12, 344.16, 344.19; 16/52, 66, 84; 248/188.2

[56] References Cited

U.S. PATENT DOCUMENTS

| | | | |
|---|---|---|---|
| 3,985,190 | 10/1976 | Kammerer et al. | 188/288 |
| 4,066,279 | 1/1978 | Kaptanis | 188/288 |
| 4,156,523 | 5/1979 | Bauer | 267/120 |
| 4,307,875 | 12/1981 | Schnitzius et al. . | |
| 4,433,759 | 2/1984 | Ichinose | 267/120 |
| 4,595,182 | 6/1986 | Freitag et al. | 267/120 |
| 4,989,698 | 2/1991 | Dony | 188/300 |
| 5,097,928 | 3/1992 | Enders | 188/300 |
| 5,435,529 | 7/1995 | Day et al. . | |
| 5,538,115 | 7/1996 | Koch | 188/300 |
| 5,553,690 | 9/1996 | Takahashi | 188/300 |

FOREIGN PATENT DOCUMENTS

| | | |
|---|---|---|
| 1964992 | 7/1967 | Germany . |
| 2653552 | 6/1978 | Germany . |
| 2659491 | 7/1978 | Germany . |
| 3301544 | 7/1984 | Germany . |
| 3934960 | 4/1991 | Germany . |
| 4009100 | 9/1991 | Germany . |
| 4114101 | 11/1992 | Germany . |
| 4142125 | 6/1993 | Germany . |

*Primary Examiner*—Robert J. Oberleitner
*Assistant Examiner*—Chris Schwartz
*Attorney, Agent, or Firm*—Nils H. Ljungman and Associates

[57] ABSTRACT

A pneumatic strut for use as an opening power assist mechanism for a motor vehicle tailgate has a piston rod extending from a piston contained within a cylinder. The piston separates the cylinder into two work chambers, each containing a gas charge under pressure. A bypass opening is active to connect the work chambers during the initial opening displacement of the tailgate to automatically open the tailgate through a first opening angle range. A second valve can be externally actuated to connect the two work chambers to further selectively open the tailgate into a second opening angle range. To close the tailgate, a third, directionally dependent valve can automatically connect the two work chambers during the closing displacement of the tailgate.

19 Claims, 7 Drawing Sheets

PNEUMATIC STRUT FOR A MOTOR VEHICLE WITH AN ADJUSTABLE LIMIT POSITION

BACKGROUND OF THE INVENTION

1. Field of the Invention

The present invention relates generally to a pneumatic strut, or gas spring, as typically used to connect a motor vehicle tailgate or hatchback with the body of the motor vehicle. The gas spring on one hand can be fastened rotationally to a vehicle body, and on the other hand to a vehicle tailgate to be opened. The gas spring can act as a lifting mechanism for an opening range of the tailgate.

The gas spring can include a cylinder which preferably contains a gas charge under pressure. The cylinder can include a base on its one end and a seal-guide unit on its other end. The gas spring can also include a piston rod which can be displaced axially and can be positioned by the seal-guide unit concentric to the cylinder, and a piston on the piston rod which can divide the cylinder into two working chambers.

The axial displacement of the piston rod can correspond in a first segment to a first opening angle range of the vehicle tailgate, whereby in the cylinder, a thrust force produced by the gas pressure can be exerted on the piston rod cross section in the first opening angle range of the vehicle tailgate. There can also be a second opening angle range in which the vehicle tailgate can be moved beyond the first opening angle range. The piston rod can be displaced as a function of this second opening angle range axially in a second segment, whereby the vehicle tailgate can be stopped in any position in the second opening angle range.

The two working chambers can be connected to one another by means of a valve system. A bypass opening can be active as a function of the piston rod position in the first displacement segment, whereby between the two working chambers on one hand there can be a second connecting channel with a directionally dependent switching valve, and on the other hand an additional piston valve.

2. Background Information

A similar known gas spring is described in German Patent No. 33 01 544. The purpose of such a gas spring is to make it possible for persons of very different sizes and strengths to open the vehicle tailgate to suit their individual requirements. In the known gas spring, it is naturally a disadvantage that, at the end of the first opening angle range, an additional opening force must be applied by the person to open the piston valve and thus to increase the opening angle of the vehicle tailgate. It could simply be assumed that larger people are probably strong enough to apply this opening force, but anyone who has ever had to deal with a defective gas spring on a vehicle can easily imagine how difficult it is to have to open the tailgate manually every time.

In other words, in the known gas spring, gas pressure opens the vehicle tailgate in a first opening angle range. However, to continue opening the vehicle tailgate beyond the first opening angle range, an additional force must be applied by the user to continue or extend the opening movement of the vehicle tailgate. Although this user-applied force might not pose a challenge to some persons, to other persons the inability of applying such an additional force (because of disability, lack of strength, etc.) may prevent the opening the vehicle tailgate beyond the first opening angle range, or may limit the extent to which the vehicle tailgate can be additionally opened. And even if the user can manually apply the additional force to open the vehicle tailgate beyond the first opening angle range, the necessity of manually opening the vehicle tailgate can be inconvenient, tiresome, or detract from the enjoyment, value or utility of the vehicle itself.

OBJECT OF THE INVENTION

The object of the present invention is to realize a gas spring which has at least two opening angle ranges and which eliminates the disadvantages of known similar devices.

SUMMARY OF THE INVENTION

The present invention teaches that this object can be accomplished by the use of a piston valve which can be actuated as desired, preferably by means of an external actuation and a valve tappet.

The person opening the vehicle tailgate can thereby utilize the opening angle of the vehicle tailgate with a gas power assist, without the person in question having to apply any opening force. The result can be a significant improvement in ease of operation.

The operation can become particularly easy, because the switchable piston valve can be stopped in any desired switch position. If, for example, the same opening angle is always used, this opening action of the vehicle tailgate or of the gas spring can be defined in a one-time process by stopping the piston valve in the opening position.

For example, the actuation can be accomplished by means of an actuator device for the vehicle tailgate, by connecting the tailgate lock to the piston valve. In that case, auxiliary energy can be used for the transmission of the actuation force. In one conceivable variant, electric current can be used as the auxiliary energy source, and can be applied to an electromagnet which is effectively connected to the piston valve. Alternatively, compressed air can be used as the auxiliary energy source and can be applied to a valve tappet which is effectively connected to the piston valve. The selection of the auxiliary energy source generally must be coordinated with the transmission energy of a central interlock system, if any, to minimize the complexity of the design and construction. As an additional advantageous possibility, a force transmission mechanism in the form of a Bowden cable can also be used.

A particularly simple actuator device for use in a possible embodiment of the present invention is an actuator device in which the actuation is performed by means of a cam in connection with a swivelling lever.

The above discussed embodiments of the present invention will be described further hereinbelow with reference to the accompanying figures.

BRIEF DESCRIPTION OF THE DRAWINGS

The present invention is described in greater detail below with reference to the embodiments illustrated in the accompanying drawings, in which.

DESCRIPTION OF THE PREFERRED EMBODIMENT

Figure 1:
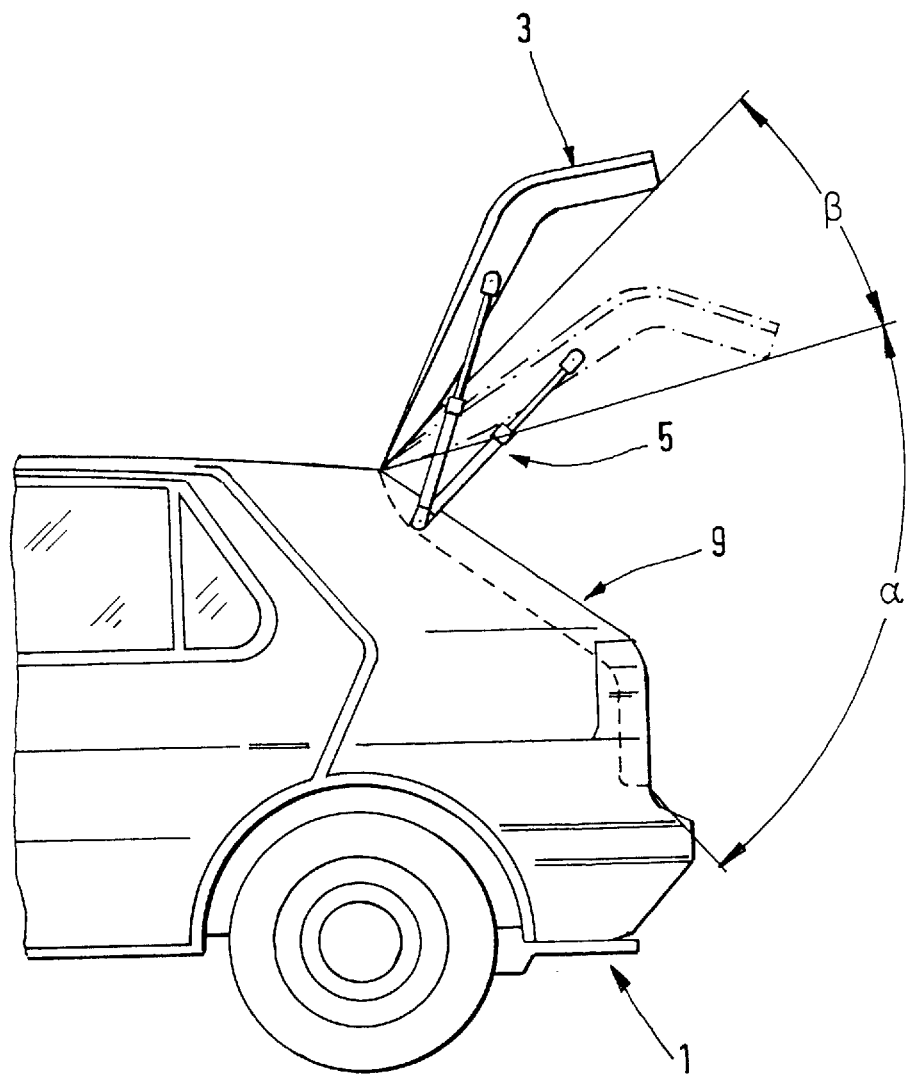
FIG. 1 shows a vehicle with a tailgate.

FIG. 1 shows a section of a vehicle 1 which can have a vehicle tailgate 3 which can be pivoted around an axis. This vehicle tailgate 3 can have a power assist mechanism in the form of a gas spring 5. To adapt the opening angle of the vehicle tailgate 3 to the size of the user or to local conditions, such as low garage ceilings, the present invention teaches that the opening angle can have at least two opening angle ranges alpha and beta. The first opening angle alpha can be designed so that it, i.e. the first opening angle alpha, can allow the user sufficient access to the vehicle 1. As a result of the construction of the gas spring 5, the first opening angle range alpha can essentially always be completely used. If necessary, the second opening angle beta can be utilized by the actuation of a valve 27 (illustrated in FIG. 3A) in the gas spring 5.

In other words, vehicle 1 can have a vehicle tailgate 3 (which can also be embodied in the form of a hatchback, liftgate, rear hatch, rear door, or a hatch door). The vehicle tailgate 3 can pivot about an axis to open and close. As illustrated in FIG. 1, the vehicle tailgate 3 is shown in three possible operating positions: closed (represented by the dashed lines), an intermediate position wherein the vehicle tailgate 3 has opened through the first opening angle alpha (represented by the dashed-dotted lines), and a fully opened position wherein the vehicle tailgate 3 has opened by an additional opening angle beta (represented by the solid lines).

The gas spring 5 can be connected between the vehicle tailgate 3 and a portion of the vehicle body 9 to assist the opening of the vehicle tailgate 3, and to support the vehicle tailgate 3 in an opened position. The present invention teaches that the gas spring 5 can apply the necessary force or thrust to automatically rotate the vehicle tailgate 3 from the closed position to the intermediate position, i.e. through the first opening angle alpha), without user assistance. Upon reaching the intermediate position the gas spring 5 can stop opening the vehicle tailgate 3, and can support the now stationary vehicle tailgate 3 in the intermediate position. If the user desires to continue opening the vehicle tailgate 3 beyond the intermediate position by some additional amount, the present invention teaches that the user need only actuate, or open, the valve 27 (described in further detail below) for the gas spring 5 to continue the opening rotation of the vehicle tailgate 3. The user can then selectively stop the vehicle tailgate 3 in the desired position within the additional opening angle beta by deactuating, or closing, the valve 27. It is not necessary for the user to apply any force to manually raise the vehicle tailgate 3 during opening; the gas spring 5 can alone apply the force or thrust necessary to rotate the vehicle tailgate 3 to any open position.

Figure 2:
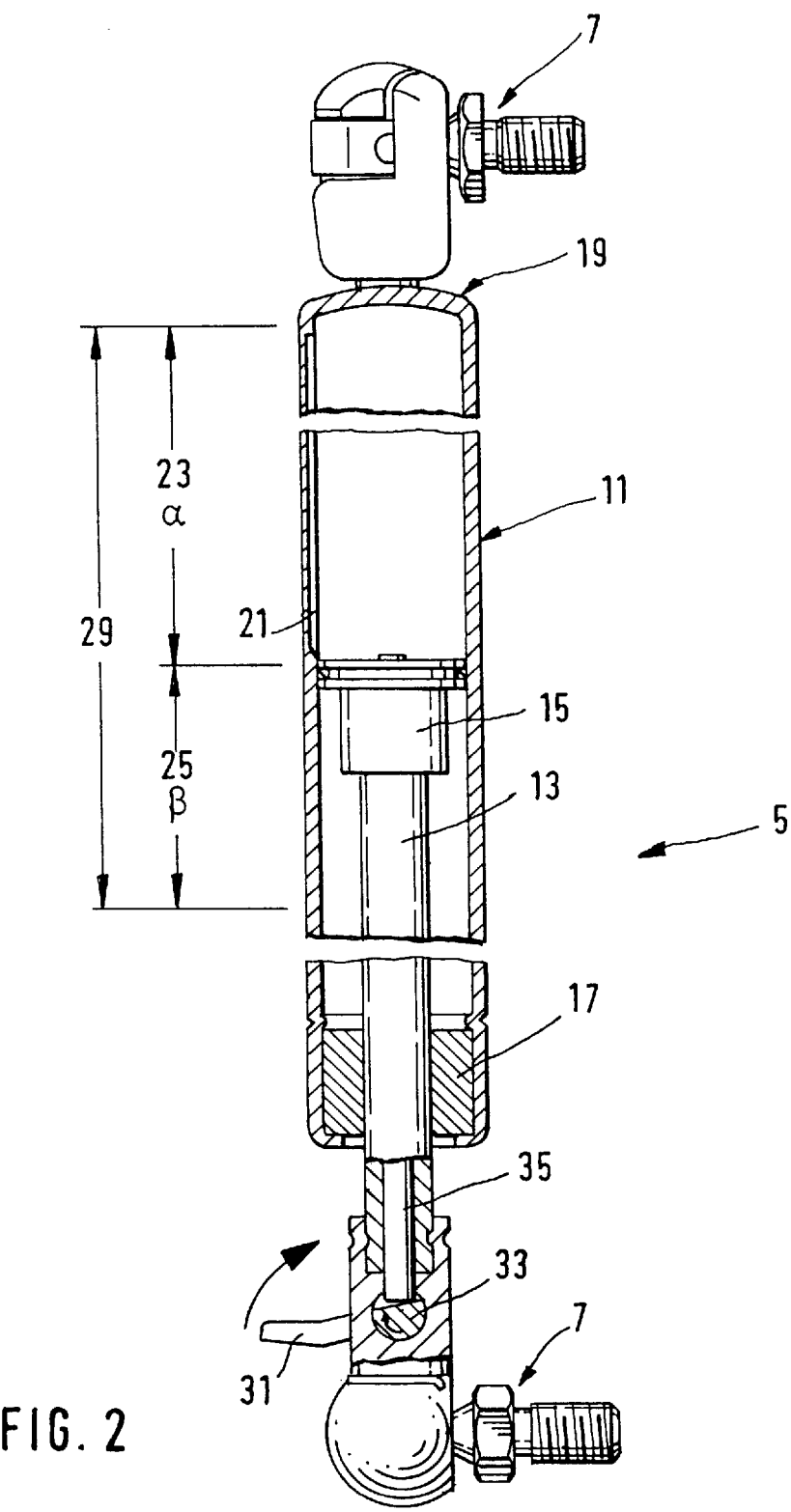
FIG. 2 shows a gas spring as an isolated part.

FIG. 2 shows the gas spring 5 preferably under gas pressure as an isolated part, with connecting mechanisms 7 to the vehicle tailgate 3 and a vehicle body 9 (See FIG. 1). Inside a cylinder 11 there can be a piston rod 13 with a piston 15, both of which piston rod 13 and piston 15 can move axially. A seal-guide unit 17 can close the cylinder 11 on one end and center the piston rod 13. Starting from a base 19 of the cylinder 11, at least one bypass opening 21 can extend over a defined length of the piston 15. This length can correspond to a first displacement distance 23 of the piston 15 during the opening of the vehicle tailgate 3 to the end of the first opening angle range alpha. At the end of the bypass opening 21, an additional displacement distance 25 can be actuated by the piston valve 27 (See FIG. 3A), as desired. The total displacement distance 29 can substantially correspond to the sum of the individual displacement distances 23 and 25.

Figure 3A:
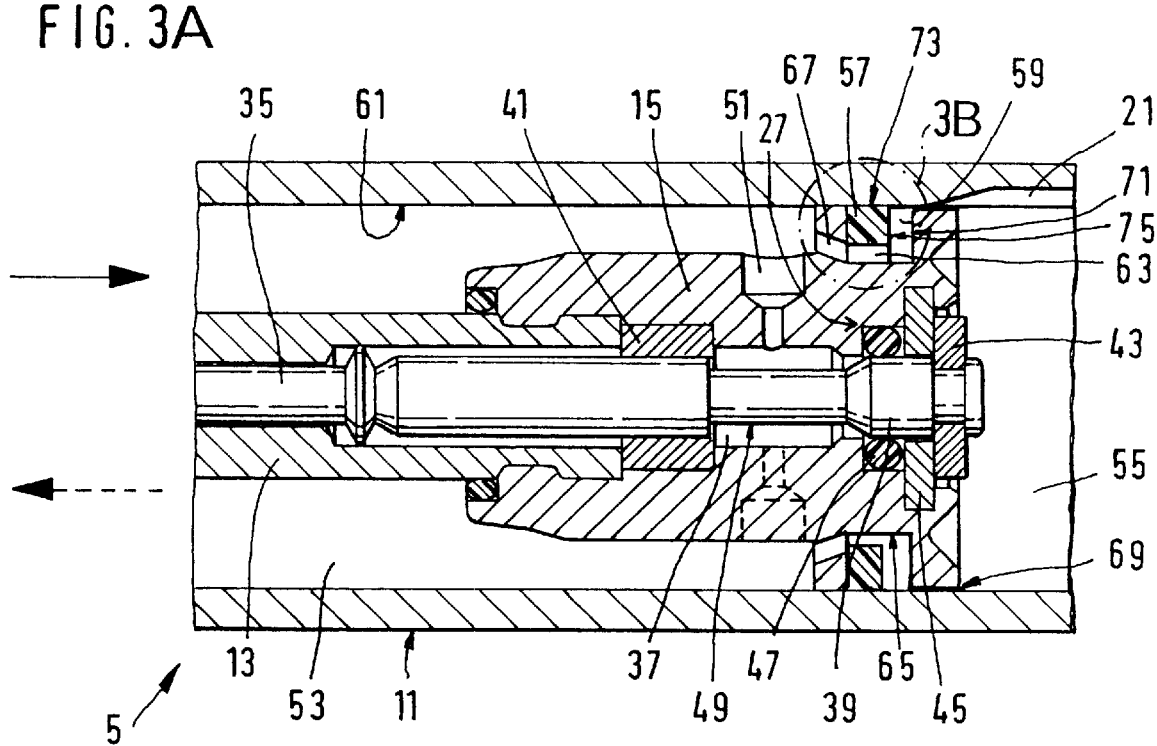
FIG. 3A is a sectional detail of a portion of the gas spring.

In this embodiment, a lever 31 with a cam 33 can be engaged with a valve tappet 35 which can open the piston valve 27 described in FIG. 3A. The lever 31 can make it possible to stop the piston valve 27 in a desired position. It can thereby become possible to determine whether the maximum opening angle position is always set, never set, or whether an intermediate position can be set by blocking.

In other words, the cylinder 11 of the gas spring 5 can contain, for various possible embodiments of the present invention, a pressurized gas (for example, compressed air or nitrogen). The piston 15 can be housed within the cylinder 11 to divide the cylinder 11 into two working chambers, an upper working chamber 55 (see FIG. 3A) and a lower working chamber 53 (see FIG. 3A). Each working chamber 53 and 55 can contain a portion of the pressurized gas.

Figure 2A:
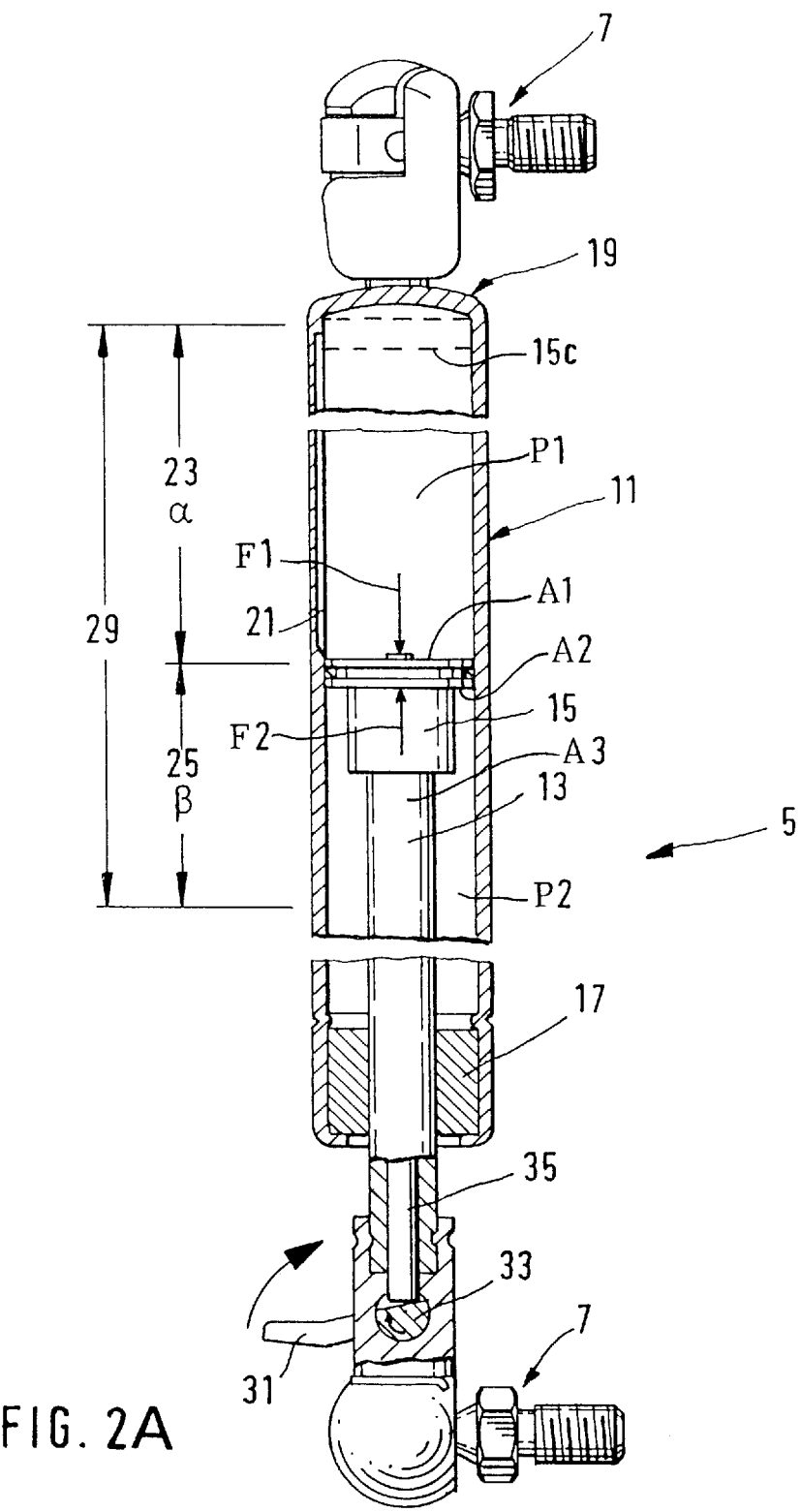
FIG. 2A also shows a gas spring as an isolated part.

As shown in FIG. 2A, the pressurized gas contained within each of the working chambers 53 and 55 (see FIG. 3A) can exert a pressure within that corresponding working chamber 53 and 55. P1 represents the pressure of the pressurized gas within the upper working chamber 55, and P2 represents the pressure of the pressurized gas within the lower working chamber 53.

The pressure P1 and P2 of the pressurized gas contained within the working chambers 55 and 53 can exert a substantially axial force or thrust on each face of the piston 15. The force and the direction of the force that can be exerted on each face of the piston 15 by the pressurized gas can be represented by the arrows F1 and F2. As viewed in FIG. 2A, F1 represents the force exerted on an upper face of the piston 15 by the pressure P1 of the pressurized gas contained within the upper working chamber 55. F2 represents the force exerted on a lower face of the piston 15 by the pressure P2 of the pressurized gas contained within the lower working chamber 53.

Note that the force F1 can attempt to push the piston 15 downwards and the force F2 can attempt to push the piston 15 upwards with reference to FIG. 2A. This corresponds to an opening (downwards) and closing (upwards) displacement of the piston 15 within the cylinder 11, and the corresponding extraction and insertion of the piston rod 13 with respect to the cylinder 11.

The magnitude of the force F1 and F2 exerted by the pressurized gas within each of the working chambers 55 and 53 can be substantially dependent on the net cross-sectional area of the corresponding upper and lower faces of the piston 15 exposed to pressurized gas. The net cross-sectional area of the upper face of the piston 15 exposed to the pressure P1 contained within the upper working chamber 55 can be represented by A1, and the net cross-sectional area of the lower face of the piston 15 exposed to the pressure P2 contained within the lower working chamber 53 can be represented by A2.

For the embodiment illustrated in FIG. 2A, the cross-sectional area A1 can be substantially greater than the cross-sectional area A2. This difference in cross-sectional area between A1 and A2 can be caused by the piston rod 13 being attached to the lower face of the piston 15 (i.e., the piston rod 13 can extend through the lower working chamber 53 to attach to the lower face of the piston 15). The piston rod 13 can obstruct or prevent the pressurized gas within the lower working chamber from pressing on, or pushing on, the entire lower surface of the piston 15. This cross-sectional area blocked by the piston rod 13 can be represented by A3 (see FIG. 2A). Hence A2, for the embodiment illustrated in FIG. 2A, can be considered equal to the area A1 minus the area A3.

The magnitude of the force F1 and F2 generated by the corresponding pressure P1 and P2 acting on the corresponding upper and lower faces of the piston ring 15 can be calculated by multiplying the value of the pressure by the cross-sectional area as shown in the equations below (in which "*" indicates multiplication):

$$F1 = P1 * A1 \quad (1)$$

$$F2 = P2 * A2 \quad (2)$$

Because A2=A1−A3, equation (2) can be rewritten:

$$F2 = P2 * (A1 - A3) \quad (3)$$

and so $$F2 = P2 * A1 - P2 * A3. \quad (4)$$

Note that if P1=P2, then P1 can be substituted into (4):

$$F2 = P1 * A1 - P1 * A3 \quad (5)$$

or, because F1=P1*A1, $$F2 = F1 - P1 * A3, \quad (6)$$

and so, when P1=P2, then F1 would be greater than F2 by the amount P1 * A3.

Therefore when substantially equal pressures are contained in each of the upper and lower working chambers 55 and 53 (i.e., when P1 essentially equals P2), F1 can exceed F2 by the amount P1 * A3. Because F1 would then be larger than F2, a net force or thrust (F1—F2) can act to push the piston 15 downward (as shown in FIG. 2A). Hence, when the pressures P1 and P2 are substantially equal, a net downward force or thrust can be exerted on the piston 15 by the pressurized gas within cylinder 11, attempting to push the piston 15 downward.

To better understand the operation of the gas spring 5, an opening and closing cycle of the embodiment of the gas spring 5 illustrated in FIG. 2A is described below.

FIG. 2A illustrates the position of piston 15 within the cylinder 11 when the gas spring 5 is in a closed position (that is, the vehicle tailgate 3 is closed). The position of the piston 15 when the vehicle tailgate 3 is closed is shown as dashed lines and referenced as 15c. As shown, the piston 15, when located in the closed position 15c, can be adjacent an end of the bypass opening 21. The bypass opening 21 can act as a channel connecting the upper working chamber 55 and the lower working chamber 53. Therefore when the piston 15 is located adjacent the bypass opening 21, the bypass opening 21 can equalize the pressures P1 and P2 within each of the corresponding working chambers 55 and 53. Therefore, for the reasons discussed above, with the gas spring 5 in its closed position, a net force or thrust can act attempting to push the piston 15 downward (which downward motion can correspond to an opening of the vehicle tailgate 3).

If the vehicle tailgate 3 is now unlocked and free to pivot as shown in FIG. 1, the piston 15 can now also be free to begin moving downward in response to the net opening force acting on the piston 15 by the pressurized gas contained in the cylinder 11. The downward movement of the piston 15 and the attached piston rod 13 can cause the vehicle tailgate 3 to pivot and begin opening as shown in FIG. 1.

As the piston 15 continues its initial downward travel, the bypass opening 21 can continue to permit pressurized gas communication between each of the working chambers 53 and 55. The pressures P1 and P2 within each of the working chambers 55 and 53 can therefore remain substantially equal to one another, and a continuous downward net force can be continuously exerted on the piston 15 as the piston 15 continues to move downward along the bypass opening 21. The length of the first displacement distance 23 along the bypass opening 21 can correspond to the pivoting of the vehicle tailgate 3 through the first opening angle range alpha. The gas spring 5 can exert a continuous net downward force on the piston 15 from the closed position of the gas spring 5 to the position represented in FIG. 2, as the vehicle tailgate 3 pivots through the first opening angle range alpha.

After moving downward the first displacement distance 23 by the force exerted by the pressurized gas contained in cylinder 11, the piston 15 can reach the opposite end of the bypass opening 21. At this point, the connection between the upper working chamber 55 and the lower working chamber 53 through the bypass opening 21 can preferably be closed by the bypass opening 21 having ended. Immediately prior to the closing of bypass opening 21 the pressures P1 and P2 were substantially equal, because the bypass opening 21 had connected the working chambers 53 and 55.

The piston 15 can continue moving downward when the bypass opening 21 closes, because the pressures P1 and P2 were substantially equal immediately prior to the closing of the bypass opening 21, and therefore a net downward force was being exerted on the piston 15. However, as the piston 15 continues to move downward, the volume of the upper working chamber 55 increases and the volume of the lower working chamber 53 decreases. Because the connection between the working chamber 55 and the lower working chamber 53 (i.e. the bypass opening 21) is now preferably closed, the pressure P1 in the upper working chamber 55 can begin to decrease with the increasing volume of the upper working chamber 55. The pressure P2 in the lower working chamber 53 can begin to increase as the pressurized gas within the lower working chamber 53 becomes compressed with the decreasing volume of the lower working chamber 53.

Therefore the continued downward motion of the piston 15 after the bypass opening 21 closes can cause the force F1 to decrease because pressure P1 is now decreasing, and can cause the force F2 to increase because pressure P2 is now increasing, until at some point the forces F1 and F2 can become equal. The piston 15 can now stop, or become "blocked", in a rest position or equilibrium position as the forces F1 and F2 can in effect cancel one another. Therefore no net force can be exerted on the piston 15 to cause the piston 15 to continue its displacement; and a stationary position can thereby be achieved with the vehicle tailgate 3 remaining held open in the intermediate opening position corresponding to the first angular opening range alpha as shown in FIG. 1.

The bypass opening 21 can be likened to a first valve, or bypass valve, of the gas spring 5. This first valve can be thought of as a valve located between the upper working chamber 55 and the lower working chamber 53. For the first displacement distance 23, the first valve is preferably open; that is, the upper working chamber 55 and the lower working chamber 53 can be connected by the first valve to substantially equalize the pressures between the two working chambers 53 and 55 and cause the pressurized gas within cylinder 11 to exert a net downward, or opening, force on the piston 15. After the piston 15 has moved in its opening displacement from its closed position the first displacement distance 23, this first valve is preferably closed, that is, the upper working chamber 55 and the lower working chamber 53 can be isolated or closed from one another. The closing of the first valve allows the piston 15 to reach an equilibrium, or stopped position, coming to rest at a first limit position corresponding to the first opening angle range alpha.

In opening the vehicle tailgate 3, a user could observe the gas spring 5 automatically opening the vehicle tailgate through a predetermined opening angle, without need for user intervention or assistance. The vehicle tailgate 3 could then come to rest in the intermediate position shown in FIG. 1, having pivoted open through the first opening angle range alpha. The predetermined first opening angle range alpha can correspond to the first displacement length 23 (which length 23 can itself correspond to the length of the bypass opening 21), and the final equilibrium, or stationary, position of the piston 15 reached after the bypass opening 21 in effect is closed and the piston 15 becomes blocked in its equilibrium position.

It can be appreciated that by changing the length of the bypass opening 21, the first displacement distance 23 and therefore the extent of the opening angle range alpha can be changed for possible variant embodiments of the present invention. If the bypass opening 21 were eliminated, the first opening angle range alpha would essentially be eliminated also, and the second opening angle range beta would make up substantially the entire opening angle range of the vehicle tailgate 3. Therefore upon opening, the vehicle tailgate 3 would remain essentially in the closed position and the user would need to actuate the valve 27 to further open the vehicle tailgate 3. If the bypass opening 21 extended the entire length of the cylinder 11, then the gas spring 5 could act to automatically open the vehicle tailgate 3 to the fully open position of the vehicle tailgate 3. The first opening angle range alpha would then essentially make up the entire opening angle range of the vehicle tailgate 3, thereby substantially eliminating any second opening angle range beta. It can thereby become possible, in variant embodiments of the present invention, to determine whether the maximum opening angle position is always set (i.e., the bypass opening 21 extends the entire effective length of the cylinder 11), never set (i.e., the bypass opening 21 is eliminated), or whether an intermediate position can be set by blocking (i.e., the bypass opening 21 extends an intermediate distance 23 along the length of the cylinder 11 as illustrated in FIG. 2A). Of course, it can also be possible to have the bypass opening 21 continue intermittently along the length of cylinder 11, to define various opening angle regions wherein the vehicle tailgate 3 could automatically be pivoted therethrough without the assistance of the user or the need to actuate the valve 27.

Once the piston 15 has come to rest after initially opening the vehicle tailgate 3 through the first opening angle range alpha, the vehicle tailgate 3 can remain stationary in the intermediate opening position as shown in FIG. 1. The user can now choose to actuate an additional opening displacement of the vehicle tailgate by opening the piston valve 27 (described in greater detail below). The piston valve 27 can be actuated or opened to connect the upper working chamber 55 and the lower working chamber 53 together, to essentially re-equalize the pressures P1 and P2 within the chambers 55 and 53. As long as the piston valve 27 is kept open by the user, the pressures within the upper and lower working chambers 55 and 53 can be essentially equal, and as described above, a net downward, or opening, force can be exerted on the piston 15 by the pressurized gas within the cylinder 11. The piston 15 can then move in the downward, or opening, direction to pivot the vehicle tailgate 3 through an additional opening angle range extending into the second opening angle range beta. By closing the piston valve 27, the upper and lower working chambers 55 and 53 can again be closed from one another, and the piston 15 can come to rest at an equilibrium position within the second opening angle range beta by the "blocking" mechanism described previously.

FIG. 3A shows a detail of the gas spring 5 with a piston 15 in the vicinity of the end of a bypass opening 21. The piston 15, which itself can have a passage opening 37, can be non-detachably connected to the hollow piston rod 13. Inside the passage opening 21 there can be a valve pin 39, which valve pin 39 can preferably be moved axially by means of the valve tappet 35. The valve pin 39 can have its own bearing point 41 on the end of the hollow piston rod 13. Fastened to the other end of the valve pin 39 is a valve disc or plate 43 which, when the piston valve 27 is in the closed position, can be supported on a stop disc 45. The stop disc 45 can be non-detachable connected to the piston 15 and can therefore be stationary with respect to the piston 15. Enclosed between the piston 15 and the stop disc 45 there can be a valve seal or gasket 47. The inside diameter of the valve seal 47, along with the valve pin 39, can form the actual valve.

In the area between the valve seal 47 and the bearing point 41, the valve pin 39 can include a contraction 49 which can be made to overlap with the valve seal 47 by means of an axial displacement of the valve tappet 35 and thus of the valve pin 39. The gas charge can thereby flow into the passage opening 37 of the piston 15. The two working chambers 53 and 55 which can be separated by the piston 15 in the cylinder 11 can be connected to one another by means of a number of preferably transverse openings 51. In this closed switched position of the piston valve 27, the gas spring 5 essentially cannot move out any farther. The gas pressure is acting on the valve pin 39 so that contact can essentially always be maintained between the valve pin 39 and the valve tappet 35, and the piston valve 27 can have a tendency to close.

In other words, FIG. 3A illustrates a possible embodiment of the second valve, realized as the pilot valve 27. The pilot valve 27 can be opened, thereby connecting the upper and lower working chambers 55 and 53 by axial displacement of the valve tappet 35 to the right (with the orientation as shown in FIG. 3A). As shown in FIG. 3A, displacing the valve tappet 35 by an actuation device (as for example, the cam 33 shown in FIG. 2) to the right can cause the valve pin 39 to also displace to the right. The displacement of the valve pin 39 can also carry the attached valve disc 43 to the right, and into the upper working chamber 55. A gap can thereby be created between the valve disc 43 and the stop disc 45. With the displacement of the valve pin 39 to the right, the reduced diametral portion, or contraction 49 can displace axially to be encircled by the valve seal 47. A clearance between the valve seal 47 and the valve pin 39 can thereby be created, opening a channel or connection between the upper working chamber 55 and the lower working chamber 53, in effect opening the pilot valve 27. The connection can include the gap between the valve disc 43 and the stop disc 45, the clearance between the valve seal 47 and the contraction 49 of the valve pin 39, the passage opening 37 and the transverse openings 51.

When the pilot valve 27 is open, the net surface area of the face of the valve disc 43 facing the upper working chamber 55 exposed to the pressurized gas can be greater than the net surface area of the opposite face of the valve disc 43, because the valve pin 39 can be attached to that opposite face. Hence when the pilot valve 27 is open and the pressurized gas within the two working chambers 53 and 55 are substantially equal in pressure, a net force can be exerted on the valve disc 43 to attempt to return the valve disc 43 to the left, and thereby close the pilot valve 27. Upon release of the valve tappet 35 by the actuation device, the pressurized gas in the cylinder 11 pushes the valve disc 43 to the left, and can thereby close the pilot valve 27 automatically.

After opening the vehicle tailgate 3 to the intermediate position, and perhaps after opening the piston valve 27 to further open the vehicle tailgate 3 to a desired final opening position, the user would now like to close the vehicle tailgate 3. It can be desirable that the upper and lower working chambers 55 and 53 be again connected to one another so as to prevent a buildup of pressure P1 (and therefore an increase in the resistance to closing that must be overcome by the user), as the upper working chamber 55 decreases in volume with the closing motion of the piston 15.

In particular, if the vehicle tailgate 3 has been opened beyond the first opening angle range alpha by opening and then subsequently closing the piston valve 27, both of the first and second valves (i.e., the bypass opening 21 and the piston valve 27) are preferably closed. It could be undesirable that the user manually open the piston valve 27 to connect the working chambers 53 and 55 while closing the vehicle tailgate 3; the user might prefer and expect to simply push on the vehicle tailgate 3 directly to close the vehicle tailgate 3.

Therefore the gas spring 5 can include a third valve (discussed in detail below) operatively connected between the upper and lower working chambers 55 and 53. This third valve can be opened and closed by relative motion between the piston 15 and the cylinder 11. During an opening motion of the piston 15, the third valve is closed, allowing the first and second valves (i.e., the discharge opening 21 and the piston valve 27) to operate as discussed above during an opening of the vehicle tailgate 3. However, once the piston 15 begins a closing motion, initiated for example by the user pushing the vehicle tailgate 3, the third valve can automatically open to create the desired flow connection between the upper and lower working chambers 55 and 53.

In addition to the piston valve 27 and the bypass opening 21, the gas spring 5 can have the third valve in the form of an axially movable switch ring or connector ring 57 inside a piston groove 59. The switch ring 57 can be under a radial bias toward an interior wall surface 61 of the cylinder 11, as a result of which there can be a friction force between the cylinder 11 and the switch ring 57. In the radially inward direction, the switch ring 57 can have a passage cross section 63 at or towards a base 65 of the piston groove 59. Inside the piston 15 there can be at least one connecting opening 67 which can connect the upper working chamber 55 with the piston groove 65. The two working chambers 53 and 55 of the cylinder 11 can be separated by the switch ring 57 as a function of the position of the switch ring 57. The piston 15 itself can form a gap 69 with the interior wall surface 61 of the cylinder 11, which gap 69 can be sufficient to allow an overflow of gas between the two working chambers 55 and 53.

The connecting openings 67 can be worked into the upper side of the piston 15. Consequently, when the piston 15 is pushed in, the gas can preferably flow via the gap 69 between the piston 15 and the interior wall surface 61 of the cylinder 11 into the piston groove 59, between the switch ring 57 and a groove side wall 71 facing the lower working chamber 53, past a circular passage cross section 63 and through connecting openings 67 into the upper working chamber 55. If the flow cross sections are sized appropriately for possible embodiments of the present invention, there can essentially be no or relatively hardly any throttling forces or damping forces. The switch ring 57 can be positively driven, and preferably always can release a passage between the two working chambers 55 and 53 when the piston 15 is moved in the insertion direction.

On the other hand, as a result of the friction force preferably active between the switch ring 57 and the interior wall surface 61 of the cylinder 11, the switch ring 57 can move towards the lower groove side wall 71. Two contact surfaces 73 and 75 of the switch ring 57 can prevent the overflow of gas from the piston groove 59 into the lower working chamber 53, so that when the piston rod 13 and piston 15 move outward, the pilot valve, or third valve, is preferably closed.

In other words, the third valve can be realized as a directionally actuated pilot valve as illustrated in FIG. 3A. An outer circumferential groove 59 can be formed about an outer diameter portion of the piston 15. The groove 59 can have a greater axial width than does the width of a sealing element, or switch ring 57, that can be retained in the annular chamber formed by the groove 59 and the cylinder 11. The piston 15 can have a reduced diameter section or portion between the groove 59 and the upper working chamber 55, to permit a flow of pressurized gas between the annular chamber formed by the groove 59 and the upper working chamber 55 via the gap between the reduced diameter portion of the piston 15 and the wall 61 of the cylinder 11.

When the piston 15 moves to the left (as shown by the dashed arrow in FIG. 3A) during an opening motion of the vehicle tailgate 3, the switch ring 57 can contact the groove side wall 71 of the piston 15 (3A illustrates this position of the switch ring 57). The contact surfaces 73 and 75 of the switch ring 57 can seal the groove 59 from the upper working chamber 55, thereby closing the third valve.

When the piston 15 moves to the right (as shown by the solid arrow in FIG. 3A) during a closing motion of the vehicle tailgate 3, the switch ring 57 can contact the groove side wall 77 of the piston 15 (FIG. 3A illustrates this position of the switch ring 57). A connection between the upper and lower working chambers 55 and 53 can thereby be created, opening this third valve. This connection can include the gap between the piston 15 and the cylinder 11, the annular chamber formed by the groove 59 and the connecting openings 67.

Figure 3B:
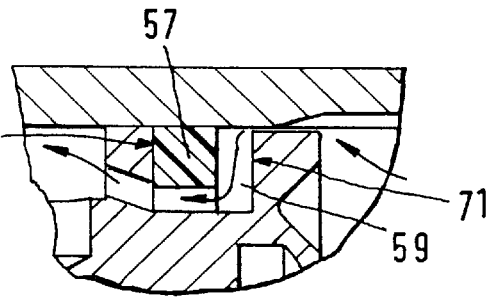
FIG. 3B is a sectional detail of another embodiment of the gas spring shown in FIG. 3A.
Figure 3C:
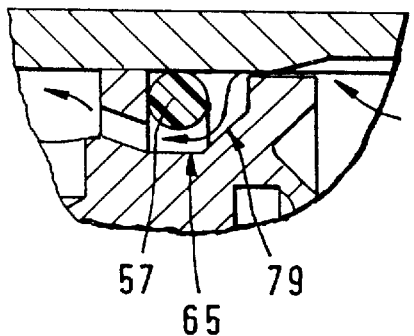
FIG. 3C is another embodiment of the sectional detail shown in FIG. 3B.

With regard to the configuration of the switch ring 57, two possible variants are illustrated in FIGS. 3B and 3C. FIG. 3B illustrates the use of a switch ring 57 which preferably has substantially a rectangular cross section and can move in an approximately rectangular groove 59 between the two groove side walls 71; 77. The arrows symbolize the gas flow.

In FIG. 3C, a switch ring 57 can be used which preferably has substantially a circular cross section. Such a switch ring 57 can be particularly relatively easy to install. To increase the bias force of the switch ring 57, in particular when the pilot valve, or third valve, is in the closed position, there can be a conical surface 79 on the base 65 of the piston groove 59 (see FIG. 3A) which, on account of the gas pressure and the friction force, can exert a force component which can be directed substantially radially outward on the switch ring 57.

The function of the gas spring 5 can be divided into two basic segments, as a function of the displacement 29 of the piston 15. In the vicinity of the bypass opening 21, which can be realized, for example, in the form of a longitudinal groove, the pilot valve or third valve preferably formed with the switch ring 57 and the piston valve 27 can be simply bridged or bypassed and are inactive in terms of their function. In this displacement distance 23 or opening angle range alpha, the gas spring 5 can function essentially like any other gas spring without a switch ring 57 and/or piston valve 27.

When the piston valve 15 reaches the end of the bypass opening 21, the switch ring 57 and the piston valve 27 can preferably become active. If the valve tappet 35 is not actuated, the piston valve 27 can remain closed. In the excursion direction, the piston valve 27 can essentially always be closed on account of the friction force. Consequently, the piston 15 stops at the end of the bypass opening 21. Any further travel in the opening direction can preferably then be a function of whether the user actuates the piston valve 27 or not, depending on what the user wishes to do. Therefore the second opening angle range beta can be used individually within the limits specified by the further displacement travel 25.

Figure 4:
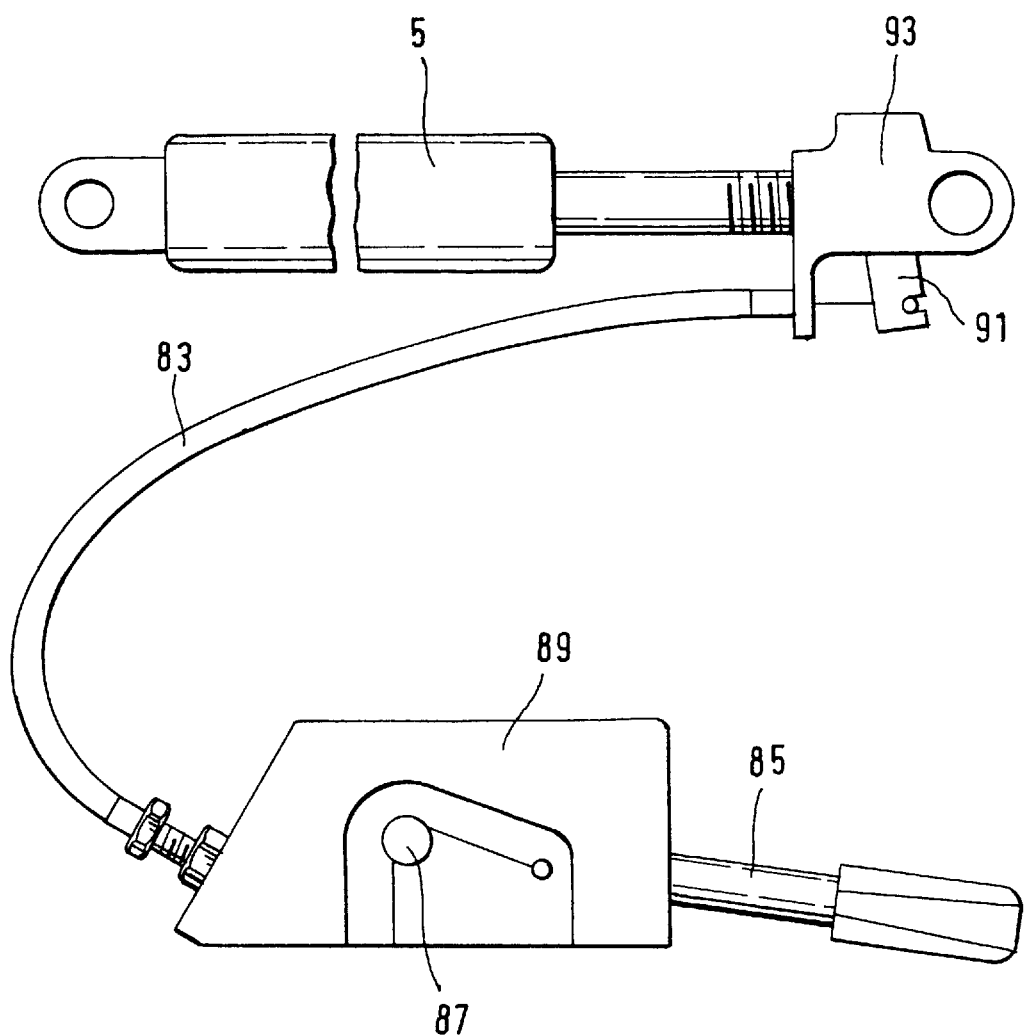
FIG. 4 illustrates a release device that could be used with a gas spring constructed in accordance with the present invention.

An important factor in the use of such a gas spring 5 is the type of actuation. FIG. 4 shows a gas spring 5 which can have an actuator device 81, in which the gas spring 5 can be connected, in the illustrated embodiment, by means of a Bowden cable 83 to an actuator lever 85. If the actuator lever 85 can be pivoted around an axis of rotation 87 of a locator housing 89, an articulated lever (not shown) in the housing 89 can convert this pivoting movement into a pulling movement of the Bowden cable 83 which is engaged with a release lever 91 of a release head 93, and thereby actuates the valve pin 39 in the piston valve 27 by means of the valve tappet 35. Of course, in other embodiments of the present invention, the actuator lever 85 can also be stopped in a connecting link in a permanent position, and/or it can be part of a vehicle tailgate opening mechanism (not shown).

In other words, the present invention teaches that, for possible variant embodiments of the present invention, different devices to actuate the piston valve 27 can be used. For example, as described above, FIG. 2 illustrates the lever 31 with the cam 33 that can open, or actuate, the piston valve 27. As shown in the embodiment illustrated in FIG. 2, the lever 31 can be located adjacent the end of the gas spring 5. However, it could be desirable to actuate the piston valve 27 by a device accessible to the user in perhaps a more convenient location. For example, the actuator lever 85 of the actuation device 81 illustrated in FIG. 4 could, in a possible embodiment of the present invention, be located in the passenger compartment of the motor vehicle 1. It can also be possible to actuate the piston valve 27 by one of two independent actuation devices to, for example, allow actuation of the piston valve 27 by one inside the passenger compartment of the motor vehicle 1 and another standing outside of the passenger compartment.

And as described in greater detail below, an auxiliary energy source (such as an electrical energy source or a magnetic energy source) can be used to actuate the piston valve 27 or to provide an alternative to the manual actuation of the piston valve 27. The actuation device powered by the auxiliary energy source can displace the valve tappet 35 of the pilot valve 27 via a release device (an example embodiment of which is shown in FIG. 5 and discussed in greater detail below).

Figure 5:
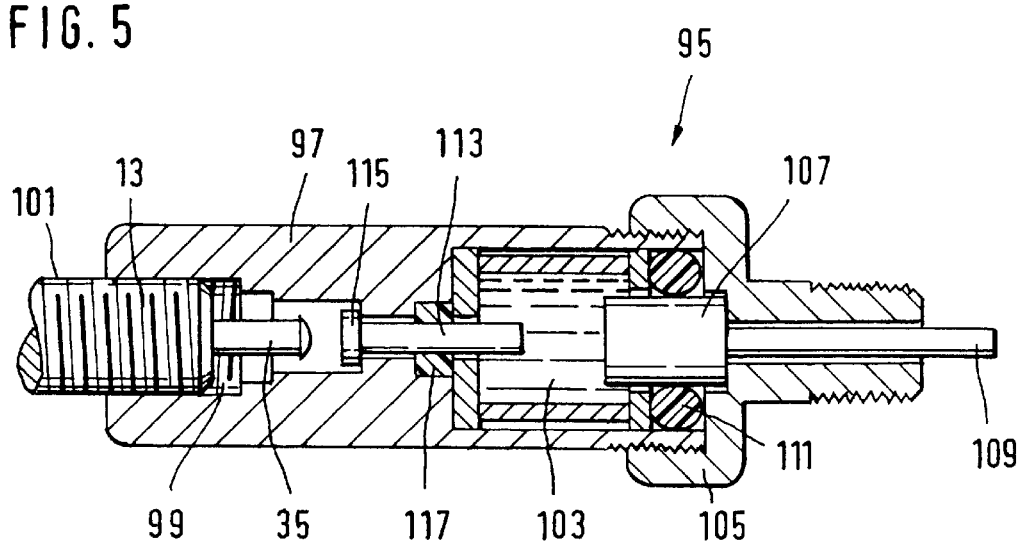
FIG. 5 illustrates an alternative release device that could be used with a gas spring constructed in accordance with the present invention.

FIG. 5 illustrates a release device 95 for the gas spring 5 as described in FIG. 3A, which release device 95 includes an adapter housing 97. An internal thread 99 of the adaptor housing 97 can preferably be screwed onto an external thread 101 of the piston rod 13. In the adapter housing 97 there can be a chamber 103 which can preferentially be filled with pressure medium. The chamber 103 can be closed by a housing cover 105. Guided through or by the housing cover 105 can be a first piston 107 which can be inserted with a piston tappet 109 into the chamber 103. The first piston 107 can be sealed by an external gasket or O-ring 111 with respect to the housing cover 105. Opposite the first piston 107 in the axial direction can be a second piston 113 which can be brought into an effective connection with a piston head 115 with the valve tappet 35. The second piston 113 can be sealed with respect to the adapter housing 97 by means of an internal gasket 117. The first piston 107 which preferably can be moved into and out of the chamber 103 has a larger diameter than the second piston 113. As a result of the insertion of the first piston 107, the second piston 113 can be displaced out of the chamber 103 and brought into effective connection with the valve tappet 35.

The pressure medium can, in alternative embodiments of the present invention, be either compressed air or hydraulic fluid. If a central interlock system installed in the vehicle 1 is operated with compressed air, compressed air can also be used as the pressure medium for this application or embodiment. The actuator device, e.g. the door closer, for the release device 95 should also preferably have two switching positions, so that the piston valve 27 can be activated as desired.

Figure 6:
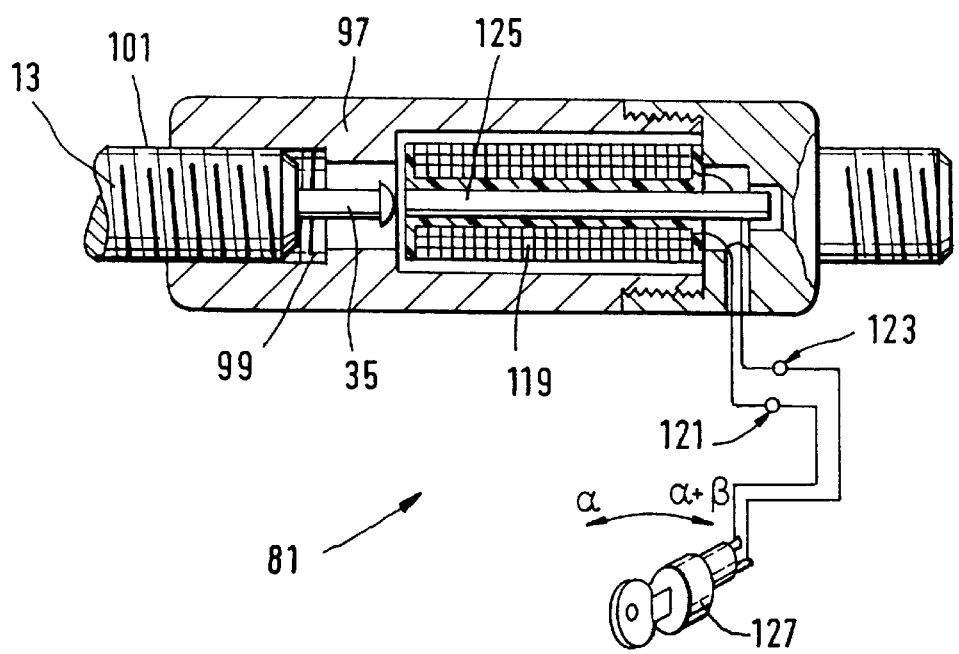
FIG. 6 illustrates yet another release device that could be used with a gas spring constructed in accordance with the present invention.

In FIG. 6, illustrating another possible embodiment of an actuator device to be used with the present invention, located in the adapter housing 97 of the actuator device 81 can be an electromagnet 119 to which an electric current can be applied by means of a first current connection 121 and a second current connection 123. In the electromagnet 119 there can be a magnetic core 125 which can preferably be displaced axially.

By applying a voltage to the current connections, the magnetic core 125 can be pushed against the valve tappet 35. A release force for the valve tappet 35 (See FIG. 3A) can essentially be not necessary, because the release can be accomplished by the electromagnet 119.

By selecting the direction of rotation of a key 127, the user can decide whether the electromagnet 119 is to be provided with power. In that case, the piston valve 27 can open and the entire opening angle alpha+beta of the vehicle tailgate 3 can be utilized. If the key 127 is turned in the counterclockwise direction, for example, the vehicle tailgate is opened, of course, but the piston valve 27 remains closed, so that only the first opening angle range alpha is available.

One feature of the invention resides broadly in the gas spring which on one hand is fastened rotationally to a vehicle body and on the other hand to a vehicle tailgate to be opened, whereby the gas spring acts as a lifting mechanism for an opening range of the tailgate and has a cylinder which contains a gas charge under pressure, whereby the cylinder has a base on its one end and a seal-guide unit on its other end, a piston rod which can be displaced axially and is positioned by the seal-guide unit concentric to the cylinder, a piston on the piston rod which redivides the cylinder into two working chambers, whereby the axial displacement of the piston rod corresponds in a first segment to a first opening angle range of the vehicle tailgate, whereby in the cylinder, a thrust force produced by the gas pressure is exerted on the piston rod cross section in the first opening angle range of the vehicle tailgate, whereby there is a second opening angle range in which the vehicle tailgate can be moved beyond the first opening angle range, and the piston rod can be displaced as a function of this second opening angle range axially in a second segment, whereby the vehicle tailgate can be stopped in any position in the second opening angle range, the two working chambers are connected to one another by means of a valve system, a bypass opening is active as a function of the piston rod position in the first displacement segment, whereby between the two working chambers on one hand there is a second connecting channel with a directionally dependent pilot valve, and on the other hand an additional piston valve, characterized by the fact that the piston valve 27 can be actuated as desired by means of an external actuation mechanism on a valve tappet 35.

Another feature of the invention resides broadly in the gas spring characterized by the fact that the switchable piston valve 27 can be stopped in the desired switching position.

Yet another feature of the invention resides broadly in the gas spring characterized by the fact that the actuation is carried out by means of an actuator device 81 of the vehicle tailgate 3.

Still another feature of the invention resides broadly in the gas spring characterized by the fact that auxiliary energy is used to transmit the release actuation.

A further feature of the invention resides broadly in the gas spring characterized by the fact that electric current is used as the auxiliary energy, and is applied to an electromagnet 119 which is effectively connected to the piston valve.

Another feature of the invention resides broadly in the gas spring characterized by the fact that compressed air is used as the auxiliary energy, and is applied to a valve tappet 35 which is effectively connected to the piston valve.

Yet another feature of the invention resides broadly in the gas spring characterized by the fact that the actuation is carried out by means of a cam in connection with a swivelling lever 31.

Some examples of vehicle hatchbacks or tailgates which could possibly be used or which could possibly be adapted for use in the context of the present invention, along with other components generally associated with vehicle hatchbacks or vehicle tailgates could be disclosed by the following U.S. Pat. Nos. 5,478,126, 5,273,327, 5,222,775, 4,436, 336 and 4,415,194.

Some examples of fasteners which could possibly be used or which could possibly be adapted for use in the context of the present invention could be disclosed by the following U.S. Pat. Nos. 5,409,320 (assigned to the assignee of the present invention), 5,383,738, 5,380,114, 5,365,639 and 5,265,965.

Some examples of gas springs or pneumatic springs which could possibly be used or which could possibly be adapted for use in the context of the present invention could be disclosed by the following U.S. Patents, each of which have been assigned to the assignee of the present invention: U.S. Pat. Nos. 5,126,925, 4,650,165 and 4,240,619.

Another example of a gas spring or pneumatic spring which could possibly be used or which could possibly be adapted for use in the context of the present invention could be disclosed by the following U.S. patent application, assigned to the assignee of the present invention: Ser. No. 08/759,320, filed Dec. 2, 1996 having inventors Alfred K. Klein and Peter Thurman, entitled "A Pneumatic Strut for a Motor Vehicle" and having Attorney Docket No. NHL-FIS-250(STAB) and claiming priority from Federal Republic of Germany Patent Application 195 44 590.2 filed Nov. 30, 1995.

Other examples of gas springs or telescoping components which could possibly be used or which could possibly be adapted for use in the context of the present invention could be disclosed by the following U.S. Pat. Nos. 5,215,291, 5,120,030, 4,921,225 and 4,744,548.

Some other examples of components generally associated with vehicle hatchbacks or vehicle tailgates or vehicle liftgates which could possibly be used or which could possibly be adapted for use in the context of the present invention could also be disclosed by the following U.S. Pat. Nos. 5,466,036, 5,120,030, 5,024,303, 5,003,136 and 4,220, 367.

Some examples of actuation devices that include Bowden cables that could possibly be used or which could possibly be adapted for use in the context of the present invention could be disclosed by the following U.S. Pat. Nos. 5,477, 641, 5,467,583, 5,428,977, 5,426,995 and 5,417,126.

The components disclosed in the various publications,

All, or substantially all, of the components and methods of the various embodiments may be used with at least one embodiment or all of the embodiments, if more than one embodiment is described herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A gas spring fastened rotationally to a vehicle body and fastened to a vehicle tailgate to be opened, whereby the gas spring acts as a lifting mechanism for an opening range of the tailgate, said gas spring comprising:

a cylinder comprising a gas charge under pressure;

the cylinder comprising a base on one end and a seal-guide unit on another end;

a piston rod being configured to be displaced axially;

the piston rod being positioned by the seal-guide unit concentric to the cylinder;

a piston being disposed on the piston rod to divide the cylinder into two working chambers;

the cylinder comprising a first segment and a second segment;

the opening range of the tailgate having a first opening angle range and a second opening angle range;

the piston rod being configured to be displaced axially in the first segment of the cylinder to move the vehicle tailgate in the first opening angle range;

the gas charge being configured to exert a thrust force on the piston rod cross section to displace the piston rod in the first segment of the cylinder;

the second opening angle range of the vehicle tailgate corresponding to movement of the vehicle tailgate beyond the first opening angle range;

the piston rod being configured to be displaced axially in the second segment of the cylinder to move the vehicle tailgate in the second opening angle range;

the piston comprising an arrangement to stop displacement of the piston rod in the second segment of the cylinder to stop the vehicle tailgate in any position in the second opening angle range;

a valve system to connect the two working chambers;

a bypass opening being configured to be active upon the piston rod being disposed in the first segment of the cylinder;

the valve system comprising a connecting channel with a directionally dependent pilot valve disposed between the two working chambers to permit flow from a first of the two working chambers to a second of the two working chambers and to limit flow from the second working chamber to the first working chamber;

the valve system comprising a piston valve;

the piston valve having an open position and a closed position;

the open position of the piston valve being configured to permit the piston rod to be displaced in the second segment of the cylinder to permit movement of the vehicle tailgate in the second opening angle range;

a valve tappet being disposed to move the piston valve into the open position; and an external actuation mechanism to actuate the valve tappet to open the piston valve and to permit closing of the piston valve.

2. The gas spring as claimed in claim 1, wherein the external actuation mechanism is configured to use auxiliary energy to actuate the valve tappet.

3. The gas spring as claimed in claim 2, wherein:

the auxiliary energy is electric current;

the external actuation mechanism comprises an electromagnet;

the electric current is configured to be applied to the electromagnet; and the electromagnet is connected to the piston valve.

4. The gas spring as claimed in claim 2, wherein:

the auxiliary energy is compressed air;

the compressed air is configured to be applied to the valve tappet; and the valve tappet is connected to the piston valve.

5. The gas spring as claimed in claim 1, wherein the external actuation mechanism is configured to stop the piston valve in a desired position.

6. The gas spring as claimed in claim 1, wherein the external actuation mechanism comprises an actuator device of the vehicle tailgate to actuate the valve tappet.

7. The gas spring as claimed in claim 1, wherein the external actuation mechanism comprises a cam in connection with a swivelling lever.

8. A strut for permitting the moving and positioning and the holding of a tailgate of a motor vehicle with respect to the motor vehicle, said strut comprising:

a cylinder having a longitudinal axis;

said cylinder being configured to be attached to one of the tailgate and the motor vehicle;

a piston rod having a first end portion and a second end portion;

said first end portion of said piston rod being disposed within said cylinder;

said second end portion of said piston rod extending out of said cylinder;

said second end portion of said piston rod being configured to be attached to the other of the tailgate and the motor vehicle;

a piston being disposed within said cylinder;

said piston being connected to said first end portion of said piston rod;

said piston being disposed to divide said cylinder into first and second chamber portions;

working fluid being disposed within said first and second chamber portions;

said working fluid having a first pressure in said first chamber portion and a second pressure in said second chamber portion;

said piston and said piston rod being disposed to be axially movable with respect to said cylinder;

said piston and said piston rod being extendable from a first position corresponding to the tailgate being closed to a second position corresponding to the tailgate being partially opened;

said piston and said piston rod being further extendable from the second position to a third position corresponding to the tailgate being substantially completely opened;

the first pressure of said working fluid in said first chamber portion generating a force on said piston to move said piston and said piston rod from the first position towards the second and third positions;

a first flow channel extending between said first chamber portion and said second chamber portion;

said piston comprising a first valve arrangement to open and close said first flow channel;

said piston comprising a second valve arrangement to permit said piston and said piston rod to selectively maintain a stationary position between the second position and the third position to hold the tailgate stationary with respect to the motor vehicle;

an actuator to operate said first valve arrangement;

said actuator being operatively connected to said first valve arrangement to permit selective opening and closing of said first valve arrangement;

a mechanism extending externally from said strut being configured and disposed to permit actuation of said actuator;

said actuator comprising a tappet;

said tappet being operatively connected to said first valve arrangement;

said tappet being axially movable to open and close said first valve arrangement;

said externally extending mechanism comprising structure being configured and disposed to move said tappet;

said first valve arrangement being configured to permit extension of said piston and said piston rod from the second position toward the third position by the force of the first pressure in the first chamber portion acting on said piston upon said first valve arrangement being opened by said actuator;

at least one of said cylinder and said piston being configured to form a second flow channel upon said piston and said piston rod being disposed between the first and second positions;

said second flow channel being configured to permit said piston and said piston rod to be extended from the first position to the second position by the force of the first pressure in said first chamber portion acting on said piston; and said second flow channel extending between said first chamber portion and said second chamber portion.

9. The strut according to claim 8, wherein:

said piston rod has a longitudinal axis;

said piston rod comprises a bore extending along the longitudinal axis thereof;

said tappet is disposed within said piston rod bore;

said tappet extends between said first and second end portions of said piston rod; and said tappet is axially movable within said piston rod with respect to said piston rod to open and close said first valve arrangement.

10. The strut according to claim 9, wherein:

said piston is axially movable with respect to said cylinder in a first direction of motion and an opposite second direction of motion;

said first direction of motion of said piston with respect to said cylinder corresponds to a movement of said piston and said piston rod towards said third position;

said second direction of motion of said piston with respect to said cylinder corresponds to a movement of said piston and said piston rod towards said first position;

said strut comprises a third flow channel;

said second valve arrangement is disposed to open and close said third flow channel upon said piston and said piston rod being disposed between the second and third positions;

said second valve arrangement is disposed to close said third flow channel upon both said piston moving in the first direction of motion and said piston and said piston rod being disposed between the second and third positions; and said second valve arrangement is configured to open said third flow channel upon both said piston moving in the second direction of motion and said piston and said piston rod being disposed between the second and third positions.

11. The strut according to claim 10, wherein:

said structure to move said tappet comprises a mechanism to generate a force to apply to said tappet;

said structure to move said tappet comprises an arrangement to transfer the force generated by said force mechanism from said force mechanism to said tappet; and said force mechanism is configured to be attached to one of: the tailgate and the motor vehicle.

12. The strut according to claim 11, wherein:

said mechanism to generate a force to apply to said tappet comprises an auxiliary energy source; and said auxiliary energy source is configured and disposed to energize said mechanism to generate a force.

13. The strut according to claim 12, wherein said auxiliary energy source comprises one of: electricity and a pressure medium.

14. The strut according to claim 13, wherein:

said auxiliary energy source comprises electricity;

said mechanism to generate a force comprises an electromagnet;

said arrangement to transfer a force comprises a core; and said core is disposed at least partially within said electromagnet.

15. The strut according to claim 13, wherein:

said auxiliary energy source comprises a pressure medium;

said mechanism to generate a force comprises a container;

said pressure medium is substantially sealed within said container;

said pressure medium comprises one of: compressed air and hydraulic fluid;

said mechanism to generate a force comprises a first piston;

said first piston is at least partially disposed within said container;

said first piston is selectively movable into and out of said container;

said arrangement to transfer a force comprises a second piston;

said second piston is disposed between said tappet and said container;

said second piston is at least partially disposed within said container; and said second piston is movable into and out of said container.

16. The strut according to claim 11, wherein said force mechanism is configured to be attached to a tailgate of a motor vehicle.

17. The strut according to claim 16, wherein:

said force mechanism comprises a lever;

said lever is configured and disposed to generate a force upon a torque being applied to said lever;

said arrangement to transmit the force generated by said force mechanism comprises a Bowden cable; and said Bowden cable is attached to said lever.

18. The strut according to claim 10, wherein:

said cylinder comprises a first portion and a second portion;

said piston is disposed within said first portion of said cylinder upon an extension of said piston and said piston rod from the first position to the second position;

said piston is disposed within said second portion of said cylinder upon an extension of said piston and said piston rod from the second position to the third position;

said first portion of said cylinder comprises a first end and an axially opposite second end;

said second flow channel comprises a bypass opening disposed in said first portion of said cylinder;

said bypass opening extends from said first end of said first portion of said cylinder to said second end of said first portion of said cylinder;

said bypass opening is configured to connect said first and second chamber portions upon said piston being disposed within said first portion of said cylinder;

said piston rod extends into said second chamber portion of said cylinder;

said piston comprises an annular groove disposed about the longitudinal axis of said cylinder;

said annular groove is disposed to face said cylinder;

said annular groove comprises a first surface and an opposite second surface;

each of said first and second surfaces of said annular groove is disposed substantially transverse to the longitudinal axis of said cylinder;

said first and second surfaces of said annular groove are spaced axially apart a distance from one another;

said piston comprises a portion disposed between said annular groove and said first chamber portion;

said piston portion and said second portion of said cylinder are each configured to form a gap between said piston portion and said second portion of said cylinder upon said piston being disposed in said second portion of said cylinder;

said gap between said piston portion and said second portion of said cylinder connects said first chamber portion and said annular groove with one another;

said third flow channel comprises said gap between said piston portion and said second portion of said cylinder;

said second valve arrangement comprises a switch ring to open and close said third flow channel;

said switch ring is at least partially disposed within said annular groove of said piston;

said switch ring has an outer surface facing away from said piston;

said outer surface of said switch ring is disposed to sealingly contact said cylinder upon said piston being disposed within said second portion of said cylinder;

said switch ring has a thickness defined substantially parallel to the longitudinal axis of said cylinder;

the thickness of said switch ring is less than the axial spacing between said first and second surfaces of said annular groove to permit axial movement of said switch ring between said first and second surfaces of said annular groove;

said piston comprises at least one first passage extending between said second surface of said annular groove and said second working chamber;

said at least one first passage connects said annular groove and said second working chamber with one another;

said third flow channel comprises said at least one first passage;

said switch ring is configured to seal said gap between said piston portion and said second portion of said cylinder upon said switch ring being disposed against said first surface of said annular groove to close said third flow channel;

said piston comprises an internal bore;

said internal bore of said piston extends substantially parallel to the longitudinal axis of said cylinder;

said internal bore of said piston opens adjacent to said first chamber portion of said cylinder;

said first valve arrangement comprises a valve pin at least partially disposed within said piston bore;

said valve pin is axially movable with respect to said piston;

said valve pin comprises a first end and an axially opposite second end;

said first end of said valve pin is disposed adjacent said tappet;

said second end of said valve pin extends into said first chamber portion of said cylinder;

said first valve arrangement comprises a valve disc attached to said second end of said valve pin;

said valve disc is movable with said valve pin to seal and unseal said piston bore from said first chamber portion;

said valve pin comprises a necked portion extending substantially along the longitudinal axis of said clutch;

said piston bore comprises a surface disposed to face said piston bore;

both said necked portion of said valve pin and said surface of said piston bore form an annular space between one another;

said necked portion of said valve pin is disposed to permit said annular space to open to said first chamber portion upon said valve pin being moved to unseal said piston bore from said first chamber portion;

said piston comprises at least one second passage extending from said piston bore to said second chamber portion;

said at least one second passage is disposed to connect said annular space with said second chamber portion upon said valve pin being moved to unseal said piston bore from said first chamber portion; and said first flow channel comprises each of said piston bore and said at least one second passage of said piston.

19. The strut according to claim 10, wherein:

said tappet comprises a first end and a second end;

said first end of said tappet is disposed within said cylinder;

said actuator comprises a cam;

said cam is disposed adjacent said second end of said tappet;

said cam is rotatable about an axis of rotation;

said cam comprises a surface configured to contact and move said tappet upon rotation of said cam about the axis of rotation;

said actuator comprises a lever extending away from said cam; and said lever is configured to permit selective rotation of said cam to selectively open and close said first valve arrangement.

* * * * *

UNITED STATES PATENT AND TRADEMARK OFFICE
CERTIFICATE OF CORRECTION

PATENT NO. : 5,839,719
DATED : November 24, 1998
INVENTOR(S) : Hans-Joser HOSAN, Castor FUHRMANN, and Hans-Klaus SCHNITZIUS It is certified that error appears in the above-identified patent and that said Letters Patent is hereby corrected as shown below:

In column 5, line 9, after 'chamber' insert --53--.

Figure 7:
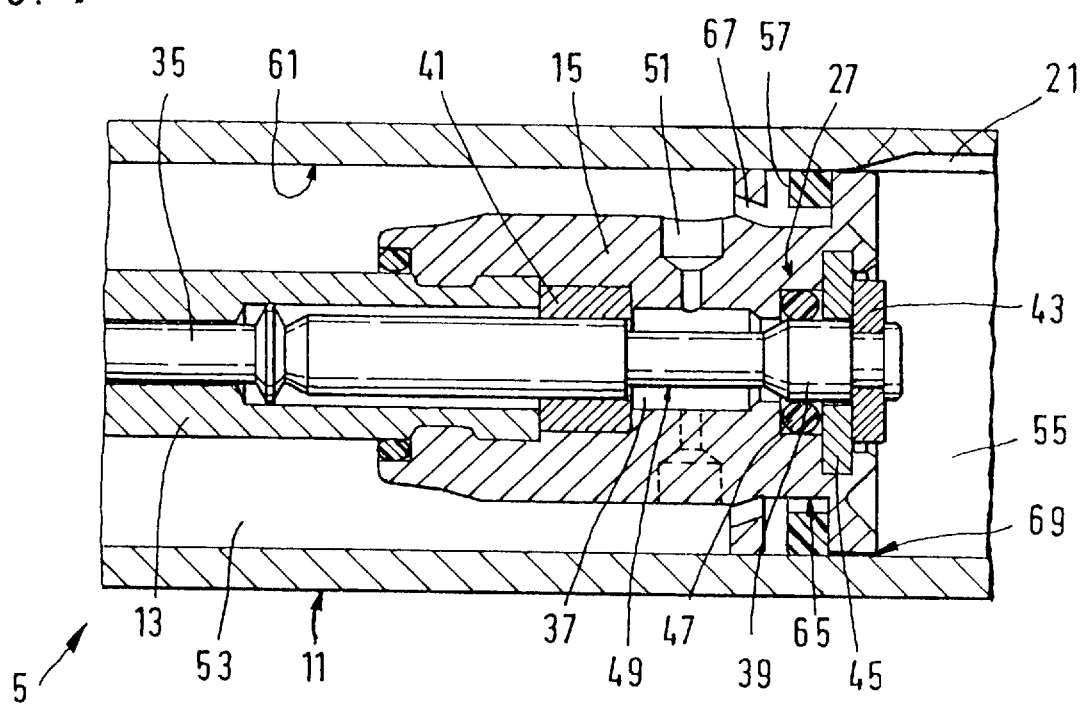
FIG. 7 shows a sectional detail of a portion of the gas spring similar to FIG. 3A, but with the switch ring in a different position.

In column 10, line 46, after '15', delete "(3A" and insert --(FIG. 7--.

In column 13, line 1, after 'which', delete "redivides" and insert --divides--.

Signed and Sealed this

Twenty-second Day of June, 1999

Attest:

Q. TODD DICKINSON

*Attesting Officer*  *Acting Commissioner of Patents and Trademarks*